United States Patent

Umeda et al.

[11] Patent Number: 6,091,169
[45] Date of Patent: Jul. 18, 2000

[54] ALTERNATOR FOR VEHICLE

[75] Inventors: Atsushi Umeda, Okazaki; Tsutomu Shiga, Aichi-ken; Shin Kusase, Oobu, all of Japan

[73] Assignee: DENSO Corporation, Kariya, Japan

[21] Appl. No.: 09/161,279

[22] Filed: Sep. 28, 1998

[30] Foreign Application Priority Data

| Sep. 26, 1997 | [JP] | Japan | 9-262229 |
| Dec. 22, 1997 | [JP] | Japan | 9-353473 |
| Jul. 23, 1998 | [JP] | Japan | 10-208189 |

[51] Int. Cl.$^7$ .................................................. H02K 9/06
[52] U.S. Cl. .................................. 310/62; 310/58; 310/263
[58] Field of Search .............................. 310/58, 59, 60 A, 310/60 R, 62, 63, 171, 263

[56] References Cited

U.S. PATENT DOCUMENTS

| 3,761,748 | 9/1973 | Baumann et al. | 310/58 |
| 4,427,908 | 1/1984 | Halmai | 310/57 |
| 5,097,167 | 3/1992 | Kanayama et al. | 310/201 |
| 5,233,255 | 8/1993 | Kusumoto et al. | 310/263 |
| 5,543,676 | 8/1996 | York et al. | 310/263 |
| 5,705,865 | 1/1998 | Ishida et al. | 310/62 |

FOREIGN PATENT DOCUMENTS

| 61-85045 | 4/1986 | Japan . |
| 61-221561 | 10/1986 | Japan . |
| 5-11769 | 2/1993 | Japan . |
| 8-308190 | 11/1996 | Japan . |

*Primary Examiner*—Elvin Enad
*Assistant Examiner*—Judson H. Jones
*Attorney, Agent, or Firm*—Pillsbury Madison & Sutro LLP

[57] ABSTRACT

It is an object of this invention to provide a compact high-power alternator for a vehicle. An alternator (1) for a vehicle includes a stator (2) and a rotor (3). The stator (2) serves as an armature. The rotor (3) operates to generate magnetic field. A front cooling fan (12) and a rear cooling fan (13) are fixed to two axial-direction ends of the rotor (3) respectively. The outside diameter (R0) of the cooling fans (12, 13) is equal to the outside diameter (R1) of the rotor (3) which is multiplied by a value of 0.90 to 0.96. The stator (2) includes a stator iron core (32), a stator winding, and an insulator (34) for providing insulation between the stator iron core (32) and the stator winding. Coil end groups (31a, 31b) extend from axial-direction end surfaces of the stator iron core (32) respectively. In the coil end groups (31a, 31b), gaps are formed between portions of the stator winding. Here, 70% or more (for example, 80%) of inner circumferential surfaces of the coil end groups (31a, 31b) is opposed to the cooling fans (12, 13).

6 Claims, 11 Drawing Sheets

ALTERNATOR FOR VEHICLE

BACKGROUND OF THE INVENTION

1. Field of the Invention

This invention relates to an alternator for a vehicle such as a passenger automotive vehicle or a truck.

2. Description of the Related Art

To reduce the aerodynamic resistance during traveling, a vehicle body tends to be formed into a slant nose shape. Securing a sufficient residential space for a passenger compartment is earnestly demanded. To satisfy these requirements, engine rooms of automotive vehicles have recently become so narrow and crowded that only a limited space is available for installing an alternator. Meanwhile, as vehicular engine noises have been lowered, there have been demands for the reduction in vehicular alternator noises. Thus, a compact, high-power, and low-noise alternator for a vehicle is required to be provided at a low cost.

One way of enabling a compact design and a high power output of an alternator for a vehicle is to improve the cooling performance of a stator winding by having the greatest heat loss.

Figure 13:
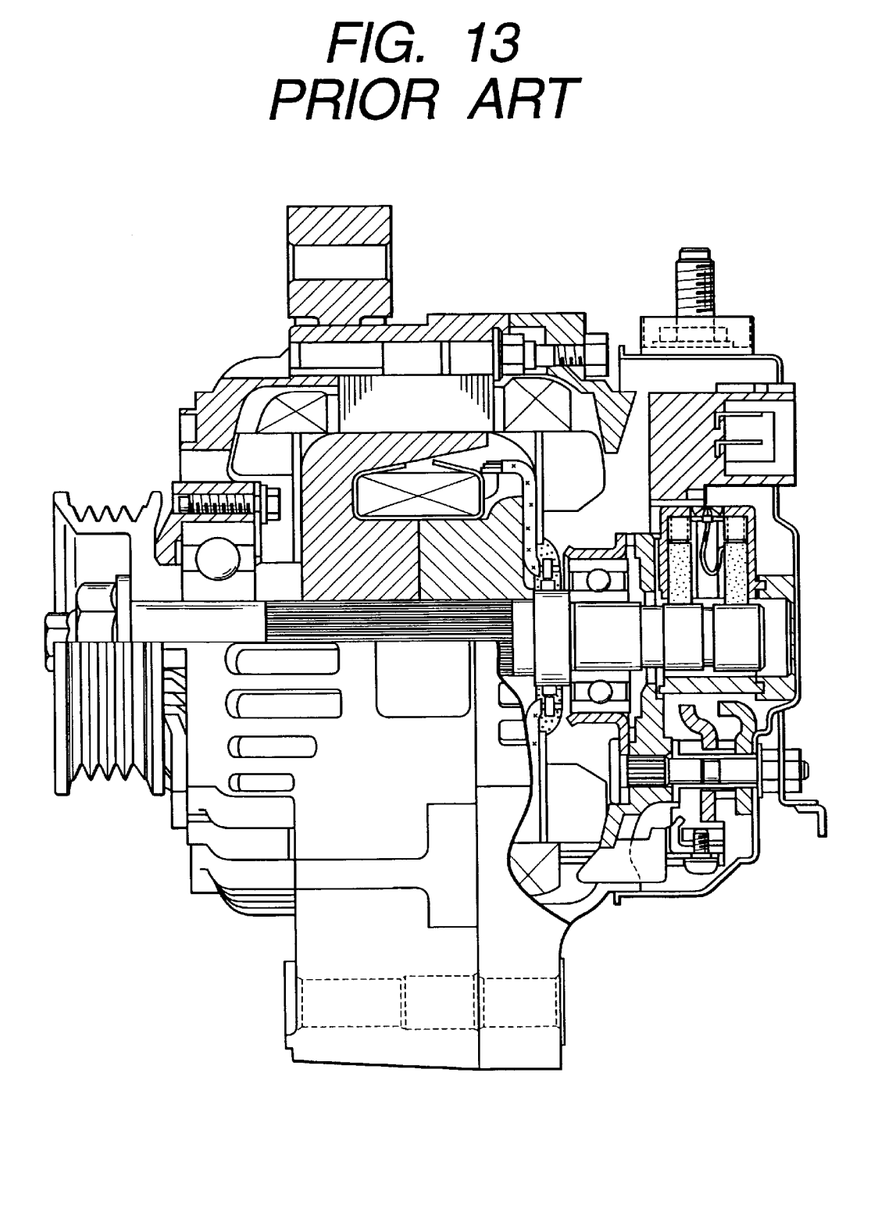
FIG. 13 is a sectional view of a prior-art alternator for a vehicle.

FIG. 13 shows a prior-art alternator having a fan-built-in structure in which cooling fans are disposed in an alternator frame to apply cooling winds directly to coil ends to cool them. The prior-art alternator of FIG. 13 has the following problem. In the prior-art alternator of FIG. 13, since the cooling fans are opposed to only tip portions of coil end groups of a stator winding, cooling winds generated by rotation of the cooling fans are applied to only the tip portions of the coil end groups before being discharged. Thus, the effect of cooling the stator winding is relatively weak.

Japanese published unexamined utility-model application 5-11769 (corresponding to U.S. Pat. No. 5,233,255) discloses an alternator for a vehicle in which coil end groups of a stator winding extend axially so as to be sufficiently opposed to cooling fans. The alternator of Japanese application 5-11769 has the following problems. In the alternator of Japanese application 5-11769, since base portions of the coil end groups are not opposed to the cooling fans, the effect of cooling the base portions of the coil end groups is relatively weak. Since the coil end height is great, the resistance of the stator winding increases and thus an alternator power output decreases.

In general, it is known that an increase in area exposed to a cooling wind and an increase in flow rate of the cooling wind improve the cooling performance.

In a fan-built-in alternator for a vehicle, inner circumferential surfaces of a coil end group are rugged since multiple-phase windings are located there while being overlapped in a circumferential direction. Such an alternator has the following problem. A collision between a cooling wind and the rugged surfaces increases a periodical pressure variation, thereby causing greater fan noise.

Japanese published unexamined patent application 8-308190 (corresponding to U.S. Pat. No. 5,543,676) discloses an alternator in which the height of a coil end group and the height of a cooling fan are approximately equal in an axial direction, and the coil end group and the cooling fan are opposed to each other. The alternator of Japanese application 8-308190 has the problem that a collision of a cooling wind and rugged inner circumferential surfaces of the coil end group increases fan noise.

SUMMARY OF THE INVENTION

In view of the above-mentioned problems, it is an object of this invention to provide a compact, high-power, and low-noise alternator for a vehicle which improves the cooling performance of a stator winding, and which reduces fan noise.

An alternator according to the present invention for a vehicle comprises a stator and a rotor. The stator includes a stator iron core and a stator winding. The stator iron core has a plurality of slots. The stator winding is provided on the stator iron core, and extends in the slots. The stator winding forms coil end groups at two ends of the stator iron core in an axial direction. The rotor includes a field iron core and a cooling fan. The field iron core is opposed to and located inward of the stator. The field iron core has magnetic pole claws. The cooling fan is located at an end of the field iron core in an axial direction. Here, 70% or more of an axial-direction height of one of the coil end groups which is located radially outward of the cooling fan overlaps the cooling fan with respect to a radial direction. A wind flow passage through which a cooling wind generated by the cooling fan passes is formed in the one of the coil end groups. Thereby, the cooling wind which is caused by rotation of the cooling fan passes through a wide region in the coil end group, and hence the cooling efficiency can be enhanced. In addition, it is possible to suppress a pressure variation caused in a region between the inner circumferential surfaces of the coil end group and the outer portion of the cooling fan. Thus, it is possible to provide an increase in cooling performance of the stator iron core and a reduction of fan noise.

According to another aspect of the present invention, the alternator for the vehicle which is mentioned above is designed so that the one of the coil end groups includes an arrangement mainly of a recurrence of coil ends having a given shape. Thus, it is possible to reduce the ruggedness in the inner circumferential surfaces of the coil end group, and it is possible to suppress a periodical pressure variation in a region between the rugged inner circumferential surfaces of the coil end group and the outer portion of the cooling fan.

According to another aspect of the present invention, the alternator for the vehicle is designed so that an outside diameter of the cooling fan is between 90% and 96% of an outermost diameter of the field iron core of the rotor. Thus, the distance between the outer portion of the cooling fan and the inner portion of the coil end group is increased, and the pressure variation of the cooling wind in that region is further reduced. Thus, it is possible to further reduce the fan noise.

According to another aspect of the present invention, the alternator for the vehicle is designed so that the one of the coil end groups has inclined portions extending slant with respect to an axial direction, and the wind flow passage is formed between the inclined portions. The cooling wind from the cooling fan can be softly received and smoothly guided by the inclined portions. Thus, it is possible to implement noise reduction even in a structure where almost the whole of a coil end group in an axial direction is directly opposed to the outer portion of a cooling fan.

According to another aspect of the present invention, the alternator for the vehicle is designed so that the cooling fan has blades whose number differs from a number of the claws of the field iron core. Thus, it is possible to prevent the occurrence of great fan noise caused by synchronization between a pressure variation due to the centrifugal fan effect at the claw side surfaces of the field iron core and a pressure variation generated by the cooling fan.

To provide a sufficient flow rate of cooling air, as in another aspect of the present invention, it is preferable that the cooling fan is provided on one of the axial-direction ends of the field iron core, and there is provided another cooling fan provided on the other axial-direction end of the field iron core. In this case, the two cooling fans are provided on the two ends of the field iron core. Noise reduction can be provided when one of the cooling fans has blades whose number differs from a number of the claws of the field iron core. The number of blades of the other cooling fan can be chosen arbitrarily. For example, the number of the blades is set different from the number of the claws of the field iron core to provide noise suppression. The number of the blades may be set equal to the number of the claws of the field iron core, and the blades may be located at the back of the claws to facilitate air flow into the regions between the claws of the field iron core.

For a compact alternator design and a noise reduction, it is preferable to use a structure in which an axial-direction edge of a coil end group and an axial-direction edge of a cooling fan are aligned with each other, and a portion (a base portion extending from an axial-direction central portion) of the cooling fan which relatively strongly forces a cooling wind is opposed to inclined portions in axial-direction intermediate portions of coil ends.

To provide a high cooling performance, an area in which the coil end group and the cooling fan are opposed to each other is preferably set so as to correspond to about 80% or more of the axial-direction dimension of the coil end group. To effectively use the air drive ability of the cooling fan, it is preferable to also use a structure in which almost the whole of the sides of radial-direction outer portions of the cooling fan blades is opposed to the inner circumferential surfaces of the coil end group.

DESCRIPTION OF THE PREFERRED EMBODIMENTS

First Embodiment

Figure 1:
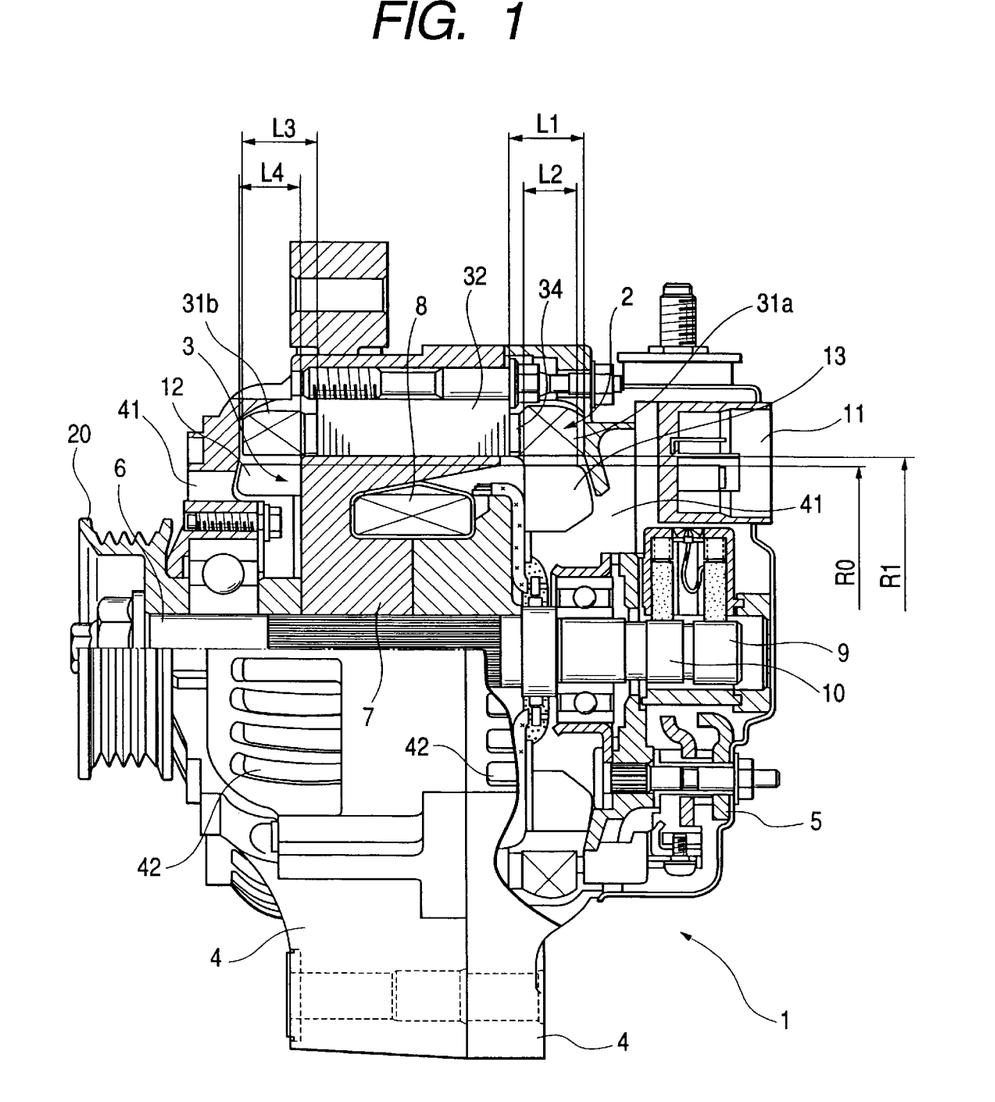
FIG. 1 is a sectional view of a main portion of an alternator for a vehicle according to a first embodiment of this invention.

With reference to FIG. 1, an alternator 1 for a vehicle according to a first embodiment of this invention includes a stator 2, a rotor 3, a housing 4, a rectifier 5, and a voltage adjustment device 11. The stator 2 serves as an armature. The rotor 3 serves to generate magnetic field. The housing 4 supports the stator 2 and the rotor 3. The rectifier 5 is directly connected to the stator 2. The rectifier 5 converts alternating current power into direct current power. The voltage adjustment device 11 adjusts a field current to control a generated electric power.

The rotor 3 rotates together with a shaft 6. The rotor 3 includes one set of Lundel-type field iron cores 7, a front cooling fan 12, a rear cooling fan 13, a field coil 8, and slip rings 9 and 10. The shaft 6 is connected to a pulley 20, and is rotated and driven by an engine (not shown) for powering the vehicle.

The front cooling fan 12 and the rear cooling fan 13 are fixed to the respective surfaces of two ends of the rotor 3 in an axial direction. The front cooling fan 12 has centrifugal fan blades and also mixed flow fan blades. The rear cooling fan 13 has centrifugal fan blades. The outside diameter R0 of the cooling fans 12 and 13 is smaller than the outermost diameter R1 of the field iron cores 7. In the first embodiment of this invention, the outside diameter R0 of the cooling fans 12 and 13 is set to 88 mm while the outermost diameter R1 of the field iron cores 7 is set to 92 mm. The number of the blades of each of the cooling fans 12 and 13 is smaller than the number of claws of related one of the field iron cores 7. In the first embodiment of this invention, the number of the blades of each of the cooling fans 12 and 13 is set to seven while the number of the claws of each of the field iron cores 7 is set to eight.

An axial-direction end of the housing 4 has inlet openings 41 for cooling winds. An outer circumferential portion of the housing 4 has two shoulders formed with outlet openings 42 which correspond to radial-direction outer portions of a first coil end group 31a and a second coil end group 31b on the stator 2.

Figure 2:
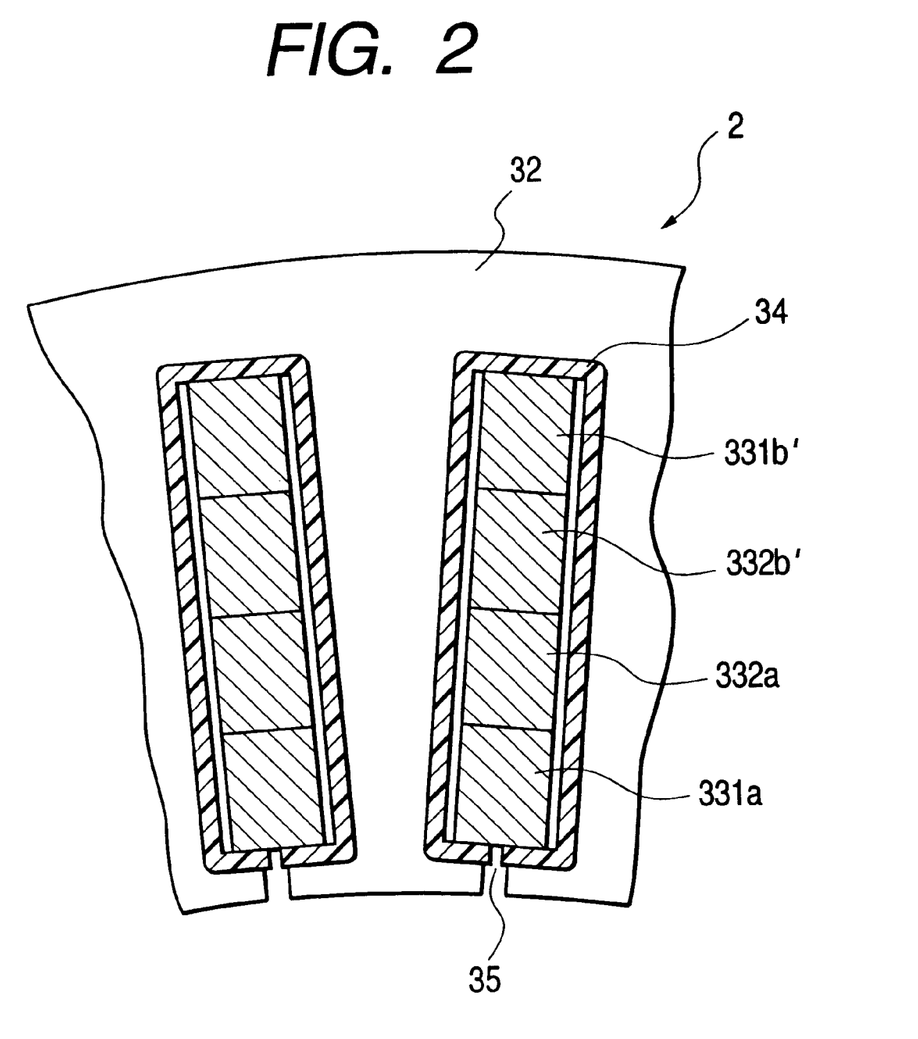
FIG. 2 is a sectional view of a portion of a stator in the first embodiment of this invention.

As shown in FIG. 2, the stator 2 has an iron core 32, a stator winding, and an insulator 34. The stator iron core 32 has a plurality of slots 35. Electric conductors (stator winding segments) placed into the slots 35 compose the stator winding. The stator winding has multiple phases. The stator winding forms the first coil end group 31a and the second coil end group 31b. The insulator 34 provides electric insulation between the stator iron core 32 and the electric conductors (the stator winding segments). As previously indicated, the stator 2 is supported by the housing 4.

In the first embodiment of this invention, the stator winding has three phases in correspondence with the number of magnetic poles on the rotor 3. The slots 35 are spaced at equal intervals so as to accommodate the 3-phase stator winding. About 80% of the inner circumferential surfaces of the first coil end group 31a is opposed to the rear cooling fan 13. About 80% of the inner circumferential surfaces of the second coil end group 31b is opposed to the front cooling fan 12.

As previously explained, the stator winding which extends in the slots 35 of the stator iron core 32 is formed by a plurality of electric conductors. Each of the slots 35 accommodates an even number of electric conductors. In the first embodiment of this invention, each of the slots 35 accommodates four electric conductors. As shown in FIG. 2, in each of the slots 35, the four electric conductors 331a, 332a, 332b', and 331b' are arranged in a line with respect to a radial direction of the stator iron core 32, and form an inner end layer, an inner mid layer, an outer mid layer, and an outer end layer, respectively.

Figure 3:
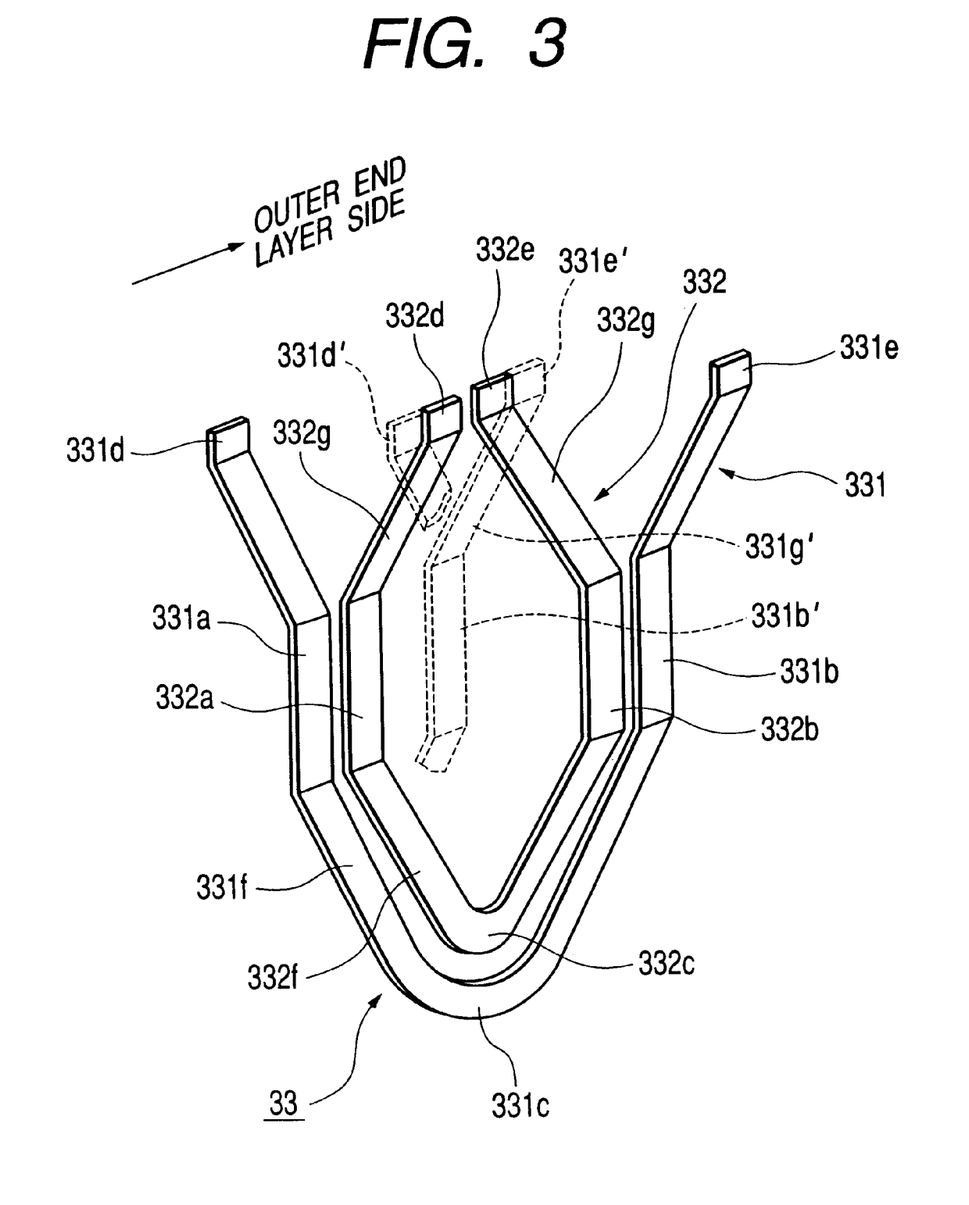
FIG. 3 is a diagrammatic perspective view of electric conductors in the first embodiment of this invention.
Figure 4:
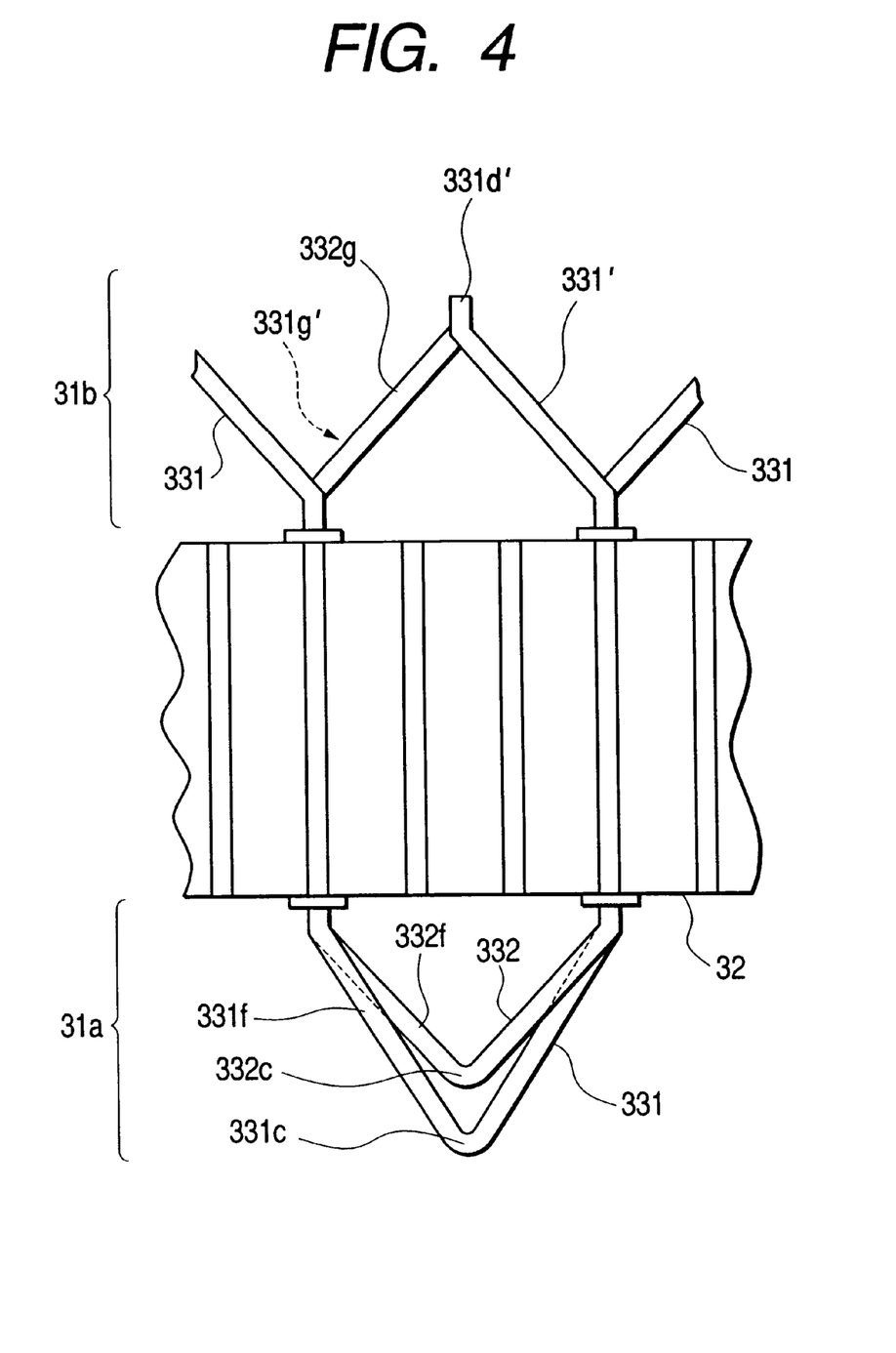
FIG. 4 is a diagram of electric conductors and a stator iron core in the first embodiment of this invention.

With reference to FIGS. 2, 3, and 4, the electric conductor 331a of the inner end layer in one slot 35 pairs with the electric conductor 331b of the outer end layer in another slot 35 which separates from the former slot 35 by a 1-magnetic-pole pitch in a clockwise direction of the stator iron core 32. Similarly, the electric conductor 332a of the inner mid layer in one slot 35 pairs with the electric conductor 332b of the outer mid layer in another slot 35 which separates from the former slot 35 by a 1-magnetic-pole pitch in the clockwise direction of the stator iron core 32. The electric conductors 331a and 331b in the pair are connected by a continuous wire portion with a turn portion 331c which extends at one of axial-direction ends of the stator iron core 32. The electric conductors 331a and 331b, and the continuous portion compose a U-shaped integral electric conductor. Similarly, the electric conductors 332a and 332b in the pair are connected by a continuous wire portion with a turn portion 332c which extends at one of the axial-direction ends of the stator iron core 32. The electric conductors 332a and 332b, and the continuous portion compose a U-shaped integral electric conductor. At one of the ends of the stator iron core 32, the continuous wire portion for connecting the electric conductor of the outer mid layer and the electric conductor of the inner mid layer is surrounded by the continuous wire portion for connecting the electric conductor of the outer end layer and the electric conductor of the inner end layer. In this way, at one end of the stator iron core 32, a connecting portion for electric conductors making a pair and extending in slots 35 is surrounded by a connecting portion for electric conductors making another pair and extending in the same slots 35. A connection between an electric conductor of the outer mid layer and an electric conductor of the inner mid layer forms a mid-layer coil end. A connection between an electric conductor of the outer end layer and an electric conductor of the inner end layer forms an end-layer coil end.

Also, the electric conductor 332a of the inner mid layer in one slot 35 pairs with the electric conductor 331a' of the inner end layer in another slot 35 which separates from the former slot 35 by a 1-magnetic-pole pitch in the clockwise direction of the stator iron core 32. Similarly, the electric conductor 331b' of the outer end layer in one slot 35 pairs with the electric conductor 332b of the outer mid layer in another slot 35 which separates from the former slot 35 by a 1-magnetic-pole pitch in the clockwise direction of the stator iron core 32. The electric conductors 332a and 331a' are connected by a junction (a joint) at the other axial-direction end of the stator iron core 32. The electric conductors 331b' and 332b are connected by a junction (a joint) at the other axial-direction end of the stator iron core 32.

Accordingly, at the other end of the stator iron core 32, a joint portion (a junction portion) for connecting an electric conductor of the outer end layer and an electric conductor of the outer mid layer, and a joint portion (a junction portion) for connecting an electric conductor of the inner end layer and an electric conductor of the inner mid layer are arranged in a radial direction of the stator iron core 32. A connection between an electric conductor of the outer end layer and an electric conductor of the outer mid layer, and a connection between an electric conductor of the inner end layer and an electric conductor of the inner mid layer form neighboring layer coil ends. In this way, at the other end of the stator iron core 32, connecting portions for pairs of electric conductors are arranged without being overlapped.

As shown in FIG. 3, an electric conductor of the inner end layer and an electric conductor of the outer end layer are portions of an approximately-U-shaped large integral wire segment 331. An electric conductor of the inner mid layer and an electric conductor of the outer mid layer are portions of an approximately-U-shaped small integral wire segment 332. A basic segment 33 is formed by a large segment 331 and a small segment 332. Each large segment 331 has portions 331a and 331b placed in slots 35 and extending in the axial direction, and inclined portions 331f and 331g extending slant with respect to the axial direction at given angles. Each small segment 332 has portions 332a and 332b placed in slots 35 and extending in the axial direction, and inclined portions 332f and 332g extending slant with respect to the axial direction at given angles. The inclined portions 331f, 331g, 332f, and 332g form coil ends. Air flow passages are formed mainly between the inclined portions 331f, 331g, 332f, and 332g.

There are basic segments 33 having a structure similar to the above-mentioned structure and extending into the slots 35 of the stator iron core 32. Regarding the second coil end group 31b, as shown in FIG. 3, an electric conductor joint portion 331e' of the outer end layer, and an electric conductor joint portion 332e of the outer mid layer are mechanically and electrically connected by welding, ultrasonic welding, arc welding, brazing, or mechanical processing. Similarly, an electric conductor joint portion 332d of the inner mid layer, and an electric conductor joint portion 331d' of the inner end layer are mechanically and electrically connected by welding, ultrasonic welding, arc welding, brazing, or mechanical processing. To provide insulation between these joint portions and support thereof, they are coated with an insulating film or an insulating member. To improve the vibration proofing and durability with respect to the environment, an insulating member may bridge a plurality of joint portions. Preferably, the insulating member is thick only in regions contacting the joint portions.

Figure 5:
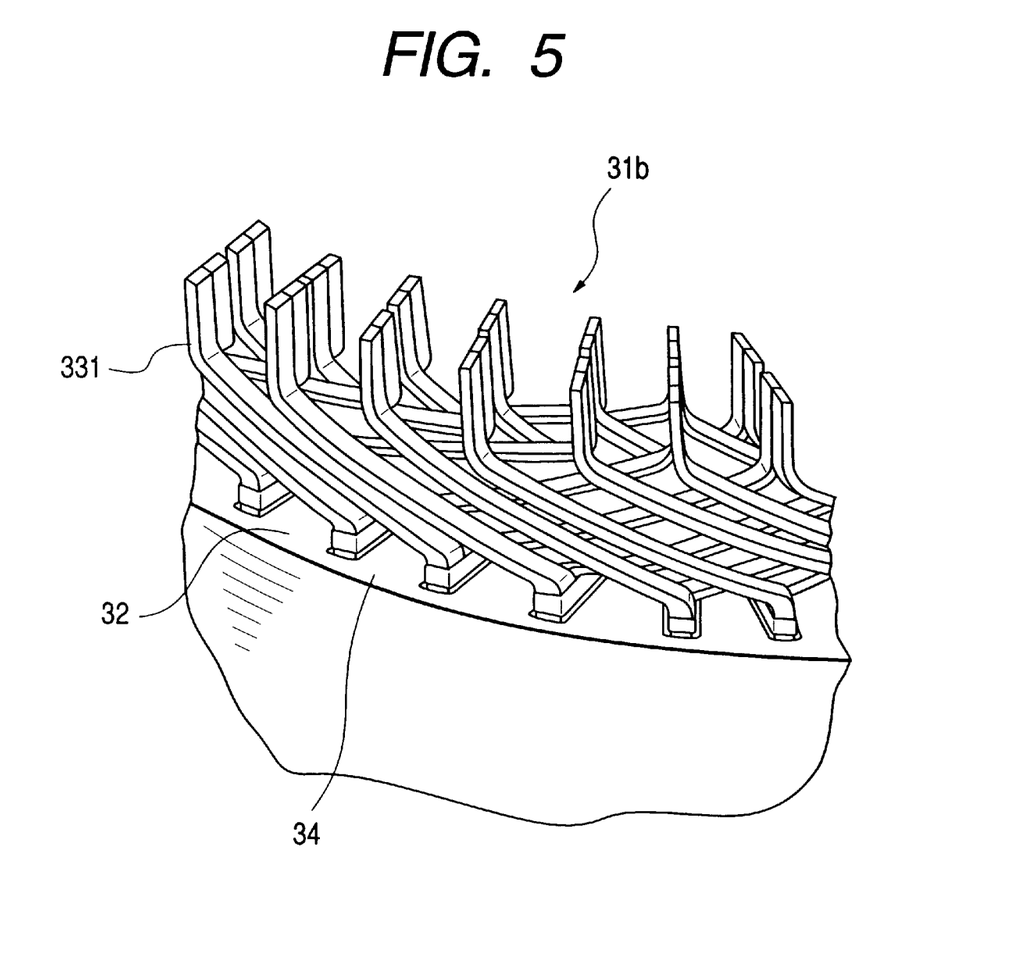
FIG. 5 is a perspective view of the electric conductors and the stator iron core in the first embodiment of this invention.

A 1-phase segment of the stator winding on the stator iron core 32 has a structure such as shown in FIG. 4. The second coil end group 31b has an arrangement such as shown in FIG. 5.

In the first coil end group 31a, mid-layer coil ends and end-layer coil ends are basic coil ends. In the second coil end group 31b, neighboring coil ends are basic coil ends. A plurality of basic coil ends are arranged while being regularly recurring. Clearances or gaps are provided among all the coil ends. The first and second coil end groups 31a and 31b are annular. In each of the first and second coil end groups 31a and 31b, coil ends are distributed at approximately a constant density along a circumferential direction.

In the first and second coil end groups 31a and 31b, many air flow passages are formed among coil ends. In each of the first and second coil end groups 31a and 31b, air flow passages are distributed at approximately a constant density along a circumferential direction.

The inner circumferential surfaces of the first and second coil end groups 31a and 31b have a diameter slightly greater than the diameter of the inner circumferential surfaces of the stator iron core 32. The first and second coil end groups 31a and 31b have approximately constant heights (axial dimensions) throughout their circumferences.

Several coil ends among the coil ends in each of the first and second coil end groups 31a and 31b have special shapes different from those of the other coil ends. These special-shape coil ends are used for lead wires and connections to the winding. Although the special-shape coil ends cause the gaps between the coil ends, that is, the air flow passages, to be locally widened or narrowed, the circumferential-direction distribution of the coil ends in each of the first and second coil end groups 31a and 31b does not have any great unevenness.

The first and second coil end groups 31a and 31b are coated with thin films of resin, and all the gaps between the coil ends are not fully blocked thereby. The thin resin films do not form a great unevenness of the distribution of the gaps between the coil ends. The thin resin films may bridge a plurality of coil ends in the radial direction. Even in this case, the thin resin films hardly affect air flow, and they do not form a great unevenness of the distribution of the gaps between the coil ends.

The first and second coil end groups 31a and 31b are formed by arrangements mainly of coil ends having a given shape. In addition, the coil ends are arranged at approximately a uniform density with respect to the circumferential direction. The distribution of the coil ends in the circumferential direction has hardly an unevenness.

The axial-direction end portions of the first and second coil end groups 31a and 31b approximately align with the axial-direction end portions of the cooling fans 12 and 13. About 80% of the axial-direction dimension of the inner circumferential surfaces of the coil end groups 31a and 31b overlaps the cooling fans 12 and 13 located inward thereof with respect to the radial direction. Especially, about 80% of the axial-direction dimension of the inner circumferential surfaces of the coil end groups 31a and 31b is opposed directly to the outermost portions of the cooling fans 12 and 13 with respect to the radial direction. Almost the entire sides of the outermost portions of the cooling fans 12 and 13 are opposed to the inner circumferential surfaces of the coil end groups 31a and 31b. Such opposed relations between the coil end groups 31a and 31b and the cooling fans 12 and 13 are maintained throughout the circumferences of the coil end groups 31a and 31b. Therefore, about 80% of the areas of the inner circumferential surfaces of the coil end groups 31a and 31b directly receives cooling winds which are driven by the rotating cooling fans 12 and 13 in radially outward directions.

In the first embodiment of this invention, the axial-direction dimension L2 of the outermost portion of the cooling fan 13 is equal to about 80% of the axial-direction dimension L1 of the coil end group 31a.

Figure 6:
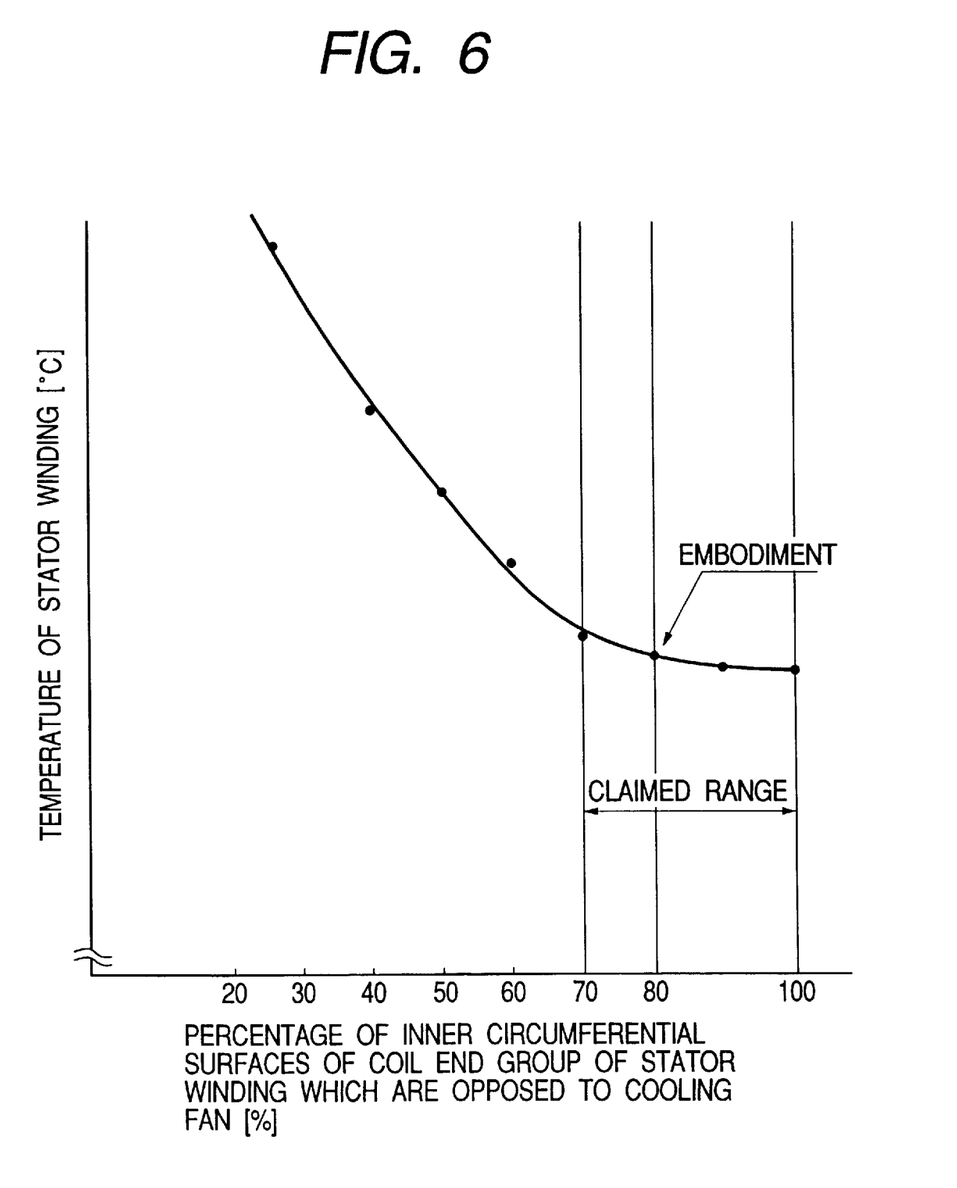
FIG. 6 is a diagram showing the effect of enhancing the cooling performance of a stator winding in the first embodiment of this invention.

FIG. 6 shows the effect of enhancing the cooling performance of the stator winding in the first embodiment of this invention. The temperature of the stator winding was measured while the percentage of the inner circumferential surfaces of the coil end groups of the stator winding which were opposed to the cooling fans were varied as parameters. The measurement of the temperature of the stator winding used a resistance method. It was found that as long as 70% or more of the inner circumferential surfaces of the coil end groups of the stator winding was opposed to the cooling fans, a good cooling performance was provided.

Figure 7:
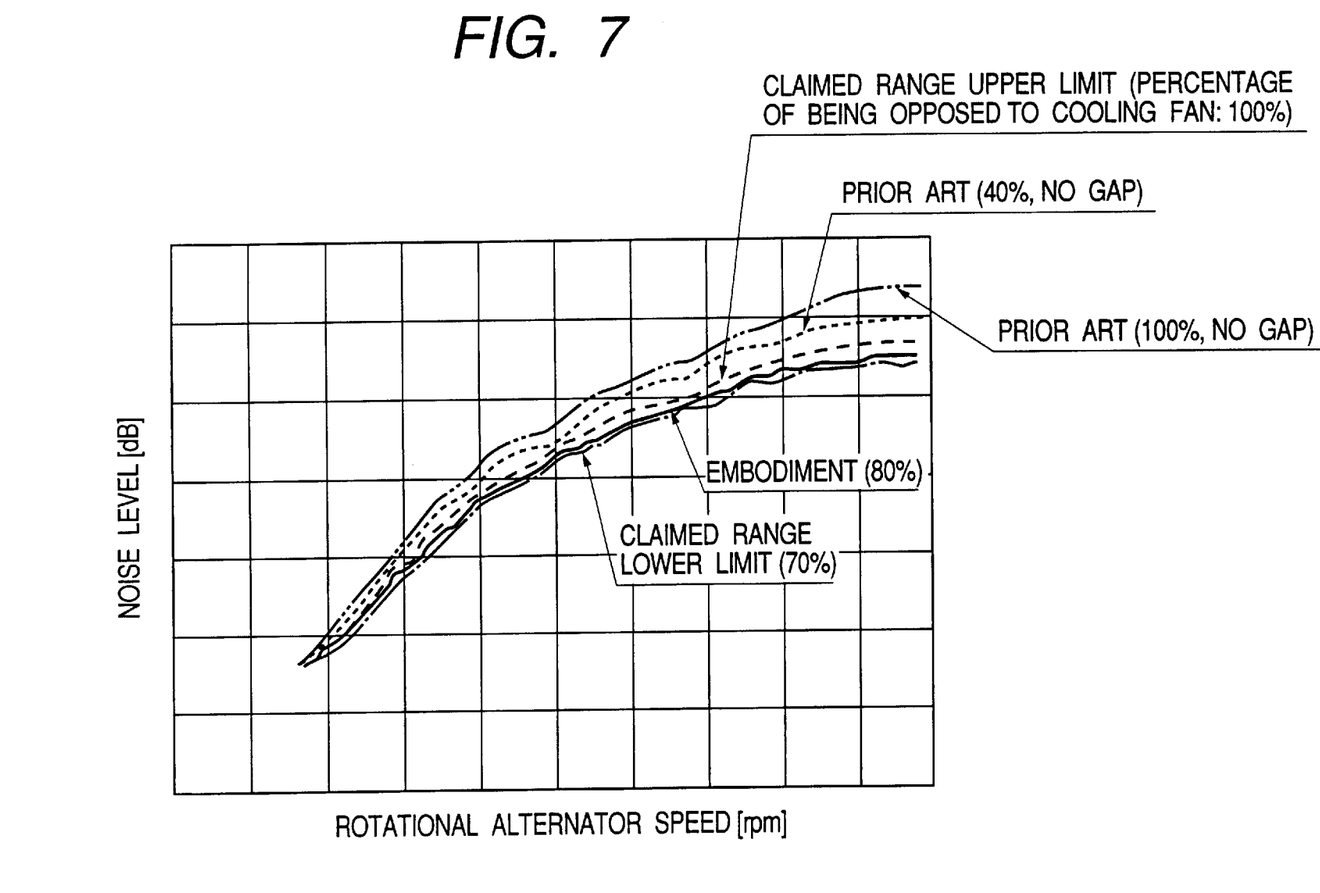
FIG. 7 is a diagram showing the fan noise reducing effect in the first embodiment of this invention.

FIG. 7 shows the fan noise reducing effect in the first embodiment of this invention. The overall value of the fan noise level was measured under the conditions where the alternator for the vehicle according to the first embodiment of this invention was operated with no load, and a microphone was placed at a position 30-cm rearward away from the rear end portion of the alternator at an angle of 45 degrees in an anechoic room.

In the first embodiment of this invention, since 80% of the inner circumferential surfaces of the coil end groups of the stator winding is opposed to the cooling fans and the gaps are formed between the coil ends in the coil end groups, it is possible to provide both an improvement of the cooling performance and a reduction of fan noise as shown in FIGS. 6 and 7.

Figure 8:
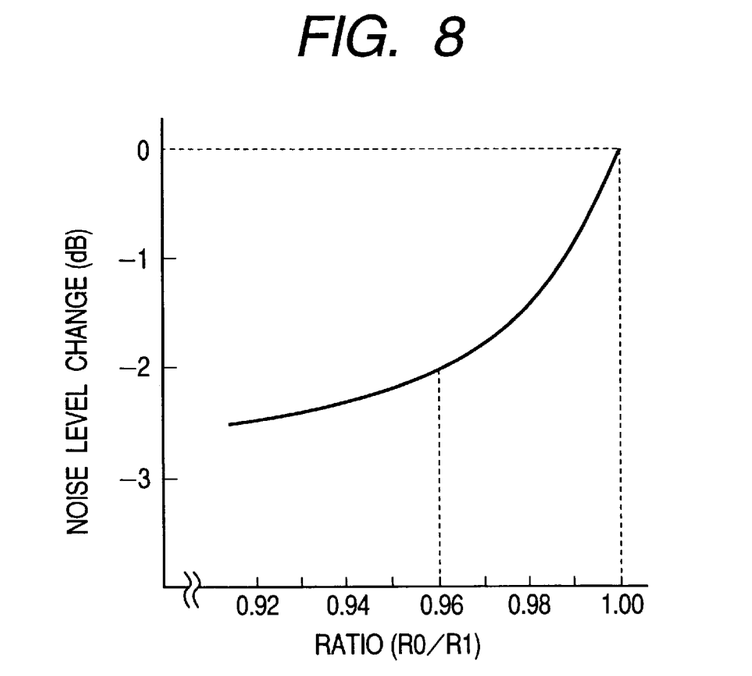
FIG. 8 is a diagram of a variation in fan noise in the first embodiment of this invention.
Figure 9:
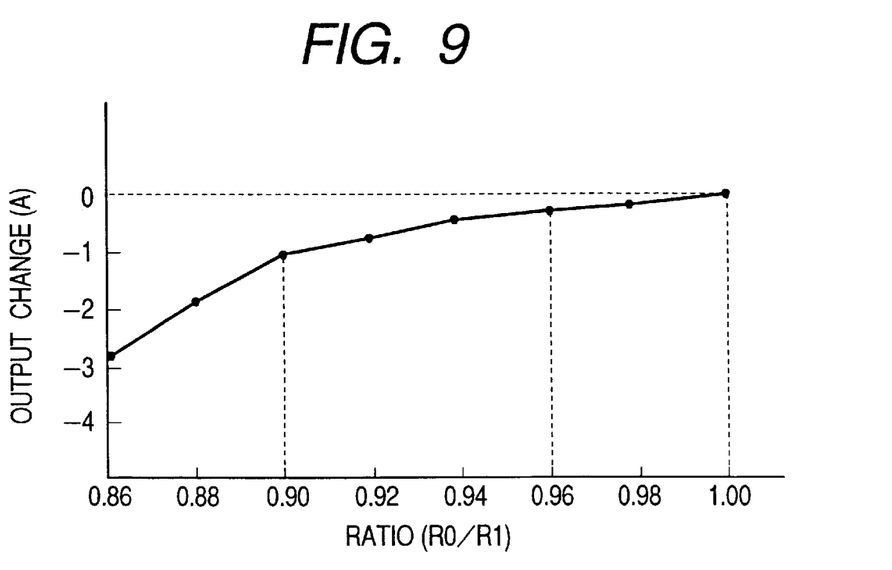
FIG. 9 is a diagram of a variation in alternator power output in the first embodiment of this invention.

FIGS. 8 and 9 show results of experiments using alternators containing stators 2 designed so that gaps were formed between electric conductors in coil end groups. During the experiments, the fan noise level was measured at an alternator rotational speed of 12,000 rpm while the outermost diameter R1 of the field iron core 7 of the rotor 3 was fixed and the outside diameter R0 of the cooling fans 12 and 13 was varied. FIG. 8 shows the experimentally derived relation between the measured fan noise level and the ratio R0/R1. During the experiments, the alternator power output was measured at an alternator rotational speed of 12,000 rpm while the outermost diameter R1 of the field iron core 7 of the rotor 3 was fixed and the outside diameter R0 of the cooling fans 12 and 13 was varied. FIG. 9 shows the experimentally derived relation between the measured alternator power output and the ratio R0/R1. It was found that when the ratio R0/R1 was between 0.90 and 0.96, the sufficient noise reducing effect was provided while a great reduction of the alternator power output was prevented.

In the case where the coil end groups are coated with thick films of resin to provide vibration proofing, the gaps between the coil ends are absent. On the other hand, in the case where thick films of resin cover only axial-direction edges of the coil end groups, a plurality of gaps are left between the bases of the coil end groups. In this case, it is important that the ranges where the gaps are left are opposed to the cooling fans while the previously-mentioned relation is maintained.

In view of the relation of the cooling fans 12 and 13 with the shrouds, it is important that the externally exposed portions of the cooling fans 12 and 13 are opposed to the coil end groups while a given relation is maintained. In the case where the edges of the outermost portions of the cooling fans 12 and 13 are formed by inclined sides, it is important that the sides are opposed to the inner circumferential surfaces of the coil end groups while the previously-mentioned relation is maintained.

Second Embodiment

Figure 10:
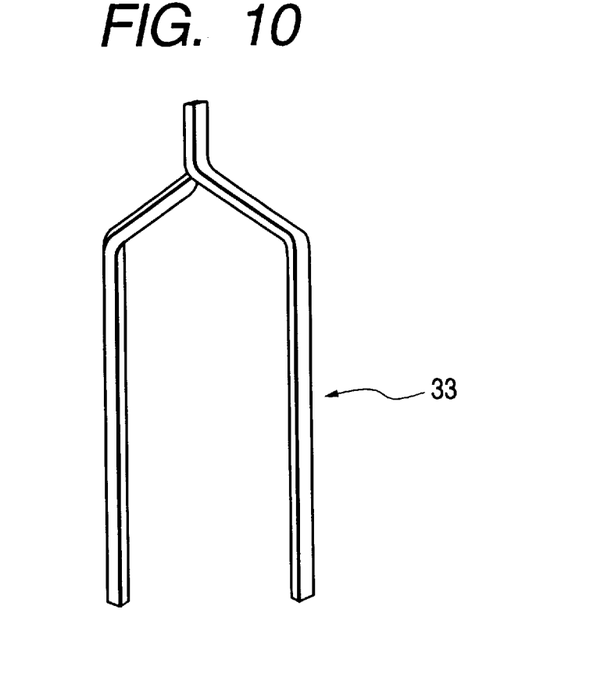
FIG. 10 is a diagrammatic perspective view of an electric conductor in a second embodiment of this invention.
Figure 11:
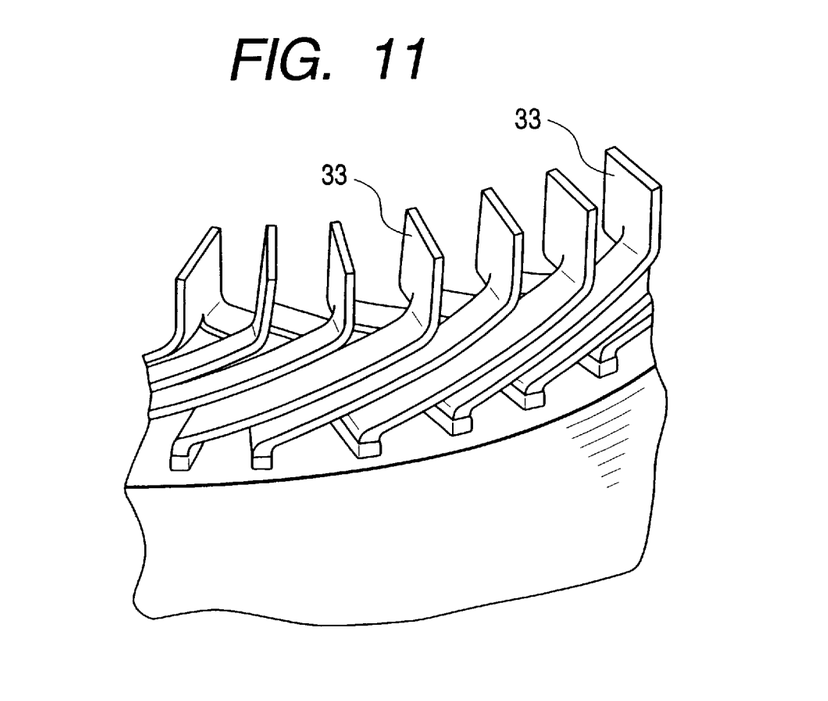
FIG. 11 is a perspective view of electric conductors and a stator iron core in the second embodiment of this invention.

The first embodiment of this invention uses stator winding segments (electric conductor segments) having overlapped turn portions. On the other hand, a second embodiment of this invention uses stator winding segments (electric conductor segments) 33 each having two legs as shown in FIG. 10. It is shown in FIG. 11 that two legs of each stator winding segment are located in different slots as an inner layer and an outer layer, respectively. In the case where there are four electric conductors per slot, they are electrically connected in series as two pairs. In the second embodiment of this invention, gaps are formed between electric conductor segments in coil end groups.

Other Embodiments

In the first embodiment of this invention, the stator winding is designed so that there are four electric conductors per slot. Alternatively, the number of electric conductors per slot may differ from four in accordance with a change in the design of each stator winding segment or in accordance with the required alternator power output.

In the first embodiment of this invention, the cooling fans are located at the two axial-direction ends of the field iron core of the rotor. In the case where the alternator is mounted on the vehicle and the cooling performance has a surplus in ambient temperature environments and required power output, it is possible to employ the structure in which a cooling fan is provided on at least one side. For example, the front cooling fan 12 may be omitted since the ambient temperature of the front side of the alternator is generally lower than that of the rear side of the alternator. In this case, only the rear cooling fan 13 is present.

One of the two cooling fans provided on the two ends of the field iron core may be a cooling fan having blades whose number differs from the number of the claws of the field iron core, and the other may be a cooling fan having blades whose number is equal to the number of the claws of the field iron core.

The number of the blades of the cooling fan can be chosen in accordance with a required cooling air flow rate under the conditions where the number of the blades of the cooling fan differs from the number of the claws of the field iron core. For example, in the case where the number of the claws is eight, the number of the blades of the cooling fan can be six, seven, nine, or ten. The number of the blades of the cooling fan may be equal to or less than the number of the claws of the field iron core. For example, in the case where the number of the claws is eight, the number of the blades of the rear cooling fan 13 may be seven while the number of the blades of the front cooling fan 12 may be eight. This design is preferable in the case where the front cooling fan 12 is a cooling fan which facilitates air flow into the regions between the claws. In the case where the number of the blades of the front cooling fan 12 is equal to the number of the claws and the blades are located at the back of the claws of the field iron core, it is possible to prevent the air flow into the regions between the claws from being blocked.

In the first embodiment of this invention, the front cooling fan 12 has centrifugal fan blades and also mixed flow fan blades while the rear cooling fan 13 has centrifugal fan blades. Alternatively, each of the cooling fans 12 and 13 may have only centrifugal fan blades or mixed flow fan blades in accordance with ambient temperature environments occurring when the alternator is mounted on the vehicle.

Figure 12A:
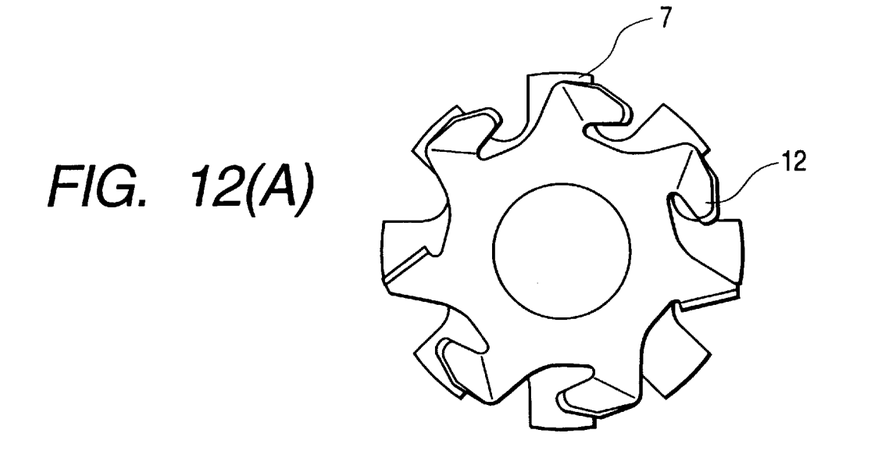
FIG. 12(A) is a diagram of a cooling fan in the first embodiment of this invention.
Figure 12B:
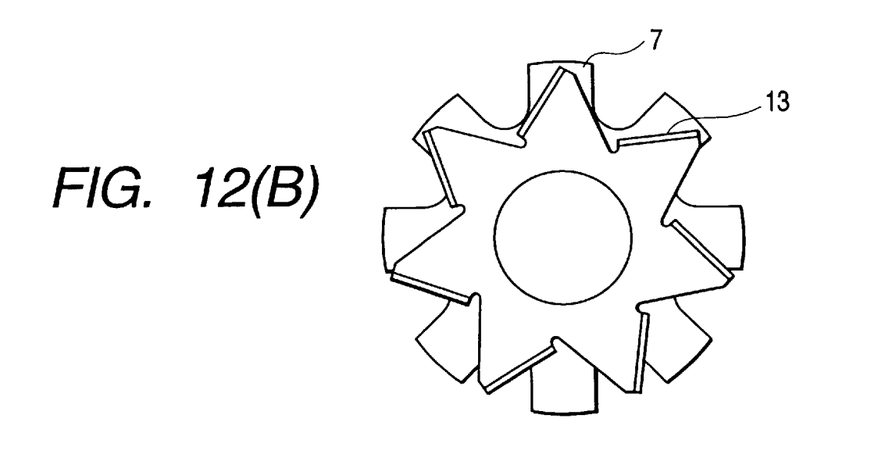
FIG. 12(B) is a diagram of a cooling fan in the first embodiment of this invention.

FIG. 12(A) and FIG. 12(B) show the front cooling fan 12 and the rear cooling fan 13 in the first embodiment of this invention. The front cooling fan 12 has two centrifugal fan blades and five mixed flow fan blades. The rear cooling fan 13 has seven axial flow fan blades.

Figure 12C:
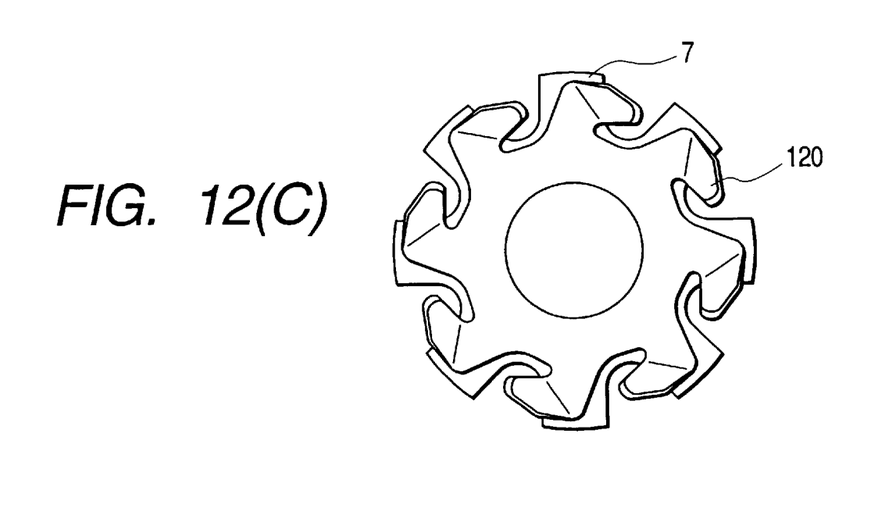
FIG. 12(C) is a diagram of a modified cooling fan.

FIG. 12(C) shows a modified front cooling fan 120. The modified front cooling fan 120 has eight mixed flow fan blades. The fan blades are located in correspondence with the back surfaces of the claws of the field iron core. The modified front cooling fan 120 of FIG. 12(C) may be combined with the rear cooling fan 13 of FIG. 12(B).

In the first embodiment of this invention, turn portions of stator winding segments are placed in the first coil end group 31a while joint portions of the stator winding segments are located in the second coil end group 31b. Alternatively, turn portions of stator winding segments may be placed in the second coil end group 31b. In this case, joint portions of the stator winding segments are located in the first coil end group 31a.

In the first embodiment of this invention, the outermost diameter R1 of the field iron cores 7 is set to 92 mm. Provided that the air-flow-based cooling structure is maintained, the outermost diameter R1 of the field iron cores 7 may be set to a value in the range of 70 mm to 110 mm.

Preferably, reinforcing ribs are absent from the cooling fans 12 and 13. In this case, the directions of travel of cooling winds drawn into the fans 12 and 13 can be smoothly changed by base portions of the cooling fans 12 and 13, and then the cooling winds can be driven radially outward by the cooling fans 12 and 13. The cooling winds travel to the coil end groups 31a and 31b which are formed with the air flow passages. Then, the cooling winds smoothly flow through the air flow passages in the coil end groups 31a and 31b. Thus, it is possible to reduce the sound of the breaking of the cooling winds by the coil ends.

It is preferable that the gaps between the coil ends form air flow passages which extend through the coil end groups 31a and 31b in the radial directions. Alternatively, the gaps between the coil ends may form air flow passages which extend slant with respect to the radial directions at given angles.

According to another modification of this invention, resin films are provided in the coil end groups to form groove-like air flow passages between the coil ends only at the inner circumferential surfaces of the coil end groups.

What is claimed is:

1. An alternator for a vehicle, comprising:
   a stator including a stator iron core and a stator winding, the stator iron core having a plurality of slots, the stator winding being provided on the stator iron core and extending in the slots, the stator winding forming coil end groups at two ends of the stator iron core in an axial direction; and
   a rotor including a field iron core and a cooling fan, the field iron core being opposed to and located inward of the stator, the field iron core having magnetic pole claws, the cooling fan being located at an end of the field iron core in an axial direction;
   wherein 70% or more of an axial-direction height of one of the coil end groups which is located radially outward of the cooling fan overlaps the cooling fan with respect to a radial direction;
   a wind flow passage through which a cooling wind generated by the cooling fan passes is formed in the one of the coil end groups;
   the one of the coil end groups has inclined portions extending in a slanted direction with respect to an axial direction, and the wind flow passage is formed between the inclined portions.

2. An alternator according to claim 1, wherein an outside diameter of the cooling fan is between 90% and 96% of an outermost diameter of the field iron core of the rotor.

3. An alternator according to claim 1, wherein the cooling fan has blades whose number differs from a number of the claws of the field iron core.

4. An alternator according to claim 3, wherein the cooling fan is provided on one of the axial-direction ends of the field iron core, and there is provided another cooling fan provided on the other axial-direction end of the field iron core.

5. An alternator for a vehicle, comprising:
   a stator including a stator iron core and a stator winding, the stator iron core having a plurality of slots, the stator winding being provided on the stator iron core and extending in the slots, the stator winding forming coil end groups at two ends of the stator iron core in an axial direction; and
   a rotor including a field iron core and a cooling fan, the field iron core being opposed to and located inward of the stator, the field iron core having magnetic pole claws, the cooling fan being located at an end of the field iron core in an axial direction;

wherein 70% or more of an axial-direction height of one of the coil end groups which is located radially outward of the cooling fan overlaps the cooling fan with respect to a radial direction; and a wind flow passage through which a cooling wind generated by the cooling fan passes is formed in the one of the coil end groups;

the one of the coil end groups includes an arrangement having recurring coil ends having a given shape;

an outside diameter of the cooling fan is between 90% and 96% of an outermost diameter of the field iron core of the rotor; and the one of the coil end groups has inclined portions extending in a slanted direction with respect to an axial direction, and the wind flow passage is formed between the inclined portions.

6. An alternator according to claim 5, wherein the cooling fan has blades whose number differs from a number of the claws of the field iron core.

* * * * *